(12) United States Patent
Benhase et al.

(10) Patent No.: US 7,415,628 B2
(45) Date of Patent: Aug. 19, 2008

(54) RESTRICTING THE EXECUTION OF COPY SERVICES COMMANDS

(75) Inventors: Michael Thomas Benhase, Tucson, AZ (US); William Frank Micka, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 10/754,830

(22) Filed: Jan. 9, 2004

(65) Prior Publication Data

US 2005/0188251 A1 Aug. 25, 2005

(51) Int. Cl.
*G06F 11/00* (2006.01)
(52) U.S. Cl. .......................... 714/5; 711/162
(58) Field of Classification Search ............. 714/5; 711/162
See application file for complete search history.

(56) References Cited

U.S. PATENT DOCUMENTS

| | | | |
|---|---|---|---|
| 5,592,618 | A | 1/1997 | Micka et al. |
| 5,615,329 | A | 3/1997 | Kern et al. |
| 6,044,444 | A | 3/2000 | Ofek |
| 6,131,148 | A | 10/2000 | West et al. |
| 6,237,008 | B1 | 5/2001 | Beal et al. |
| 6,304,980 | B1 | 10/2001 | Beardsley et al. |
| 6,408,348 | B1 | 6/2002 | Blount et al. |
| 6,434,683 | B1 | 8/2002 | West et al. |
| 6,442,709 | B1 | 8/2002 | Beal et al. |
| 6,457,109 | B1 | 9/2002 | Milillo et al. |
| 6,499,112 | B1 | 12/2002 | Milillo et al. |
| 7,058,848 | B2 * | 6/2006 | Sicola et al. .............. 714/4 |
| 7,149,919 | B2 * | 12/2006 | Cochran et al. ........... 714/4 |
| 2003/0177321 | A1 * | 9/2003 | Watanabe .................. 711/161 |
| 2005/0188166 | A1 * | 8/2005 | Fujibayashi et al. ....... 711/162 |

FOREIGN PATENT DOCUMENTS

| CA | 2271178 | 7/1999 |
|---|---|---|
| WO | WO 01/73554 A2 | 10/2001 |

OTHER PUBLICATIONS

"Single Subsystem PPRC Copy", Disclosed by International Business Machines Corporation, 41888, Research Disclosure, Feb. 1999, pp. 264.

* cited by examiner

*Primary Examiner*—Marc Duncan
(74) *Attorney, Agent, or Firm*—Scully, Scott, Murphy & Presser, P.C.

(57) ABSTRACT

A system and method for controlling peer-to-peer remote copy (PPRC) operations initiated from one or more host devices that desire to store data contents written to a first storage system to a second storage system over a communications link. The system enables receipt and generation of copy services commands from host devices and the determination of whether a received command pertains to a copy service over an established PPRC relationship for that particular customer to enable that customer to perform storage operations effecting data written to a first storage server having source volumes and stored in a remote second storage system having target volumes. The copy services command effecting data contents of source volumes and/or remote target volumes will be enabled if it is determined that said PPRC relationship is already established for that customer; and, prevented if the received copy services command does effect any volume not already in a copy services relationship.

2 Claims, 2 Drawing Sheets

RESTRICTING THE EXECUTION OF COPY SERVICES COMMANDS

CROSS-REFERENCE TO RELATED APPLICATIONS

This application relates to and wholly incorporates the subject matter of commonly-owned, U.S. patent application Ser. No. 10/811,573.

BACKGROUND OF THE INVENTION

1. Field of the Invention

The present invention relates generally to peer-to-peer remote copy (PPRC) or Flash Copy (FC) data storage technology, and specifically, to methodology for deactivating the ability to establish new PPRC or FC relationships between devices via in-band commands after initialization of the disaster recovery configuration is complete.

2. Description of the Prior Art

Peer-to-Peer Remote Copy ("PPRC") is a hardware-based disaster recovery solution designed to maintain a mirror image of application data at a remote secondary location. Particularly, key to PPRC, is the migration of data sets from mass storage devices, such as hard disk drives or other data storage media, to another set with a minimum of disruption to the applications using the data. Particularly, Peer-to-Peer Remote Copy (PPRC) mechanisms automatically copy changes that are made to a source (primary) volume to a target (secondary) volume until the PPRC relationship is suspended or terminated.

FIG. 1(a) depicts, in general, a PPRC system 10 showing a primary Enterprise Storage System 15 including a primary production Enterprise Storage Server (ESS) 17 and a host server 20 running a host application that reads and writes data to the primary ESS 17. The primary ESS 17 is linked to a secondary ESS storage system 25 including a remotely located secondary backup 27 and corresponding remote back-up host server 30 via an Enterprise Systems Connection ("ESCON") connection 45. In current configurations, the enterprise connection 45 comprises a high-speed link, supporting, for example, 2-Gigabit-per-second (Gbps) Fibre/FICON data transfer rates, however, other ESS system configurations implementing other high-data rate connectivity are applicable. As known, peer-to-peer remote copy solutions comprise functionality for enabling direct and synchronous copying of data at the volume level from the primary ESS 17 to the secondary backup ESS 27. As known, the PPRC solution for direct copying of data is transparent to the operating system of the primary ESS and any applications running on the primary hosts, however, there is a performance impact on application I/Os.

FIG. 1(b) depicts a Storage Service Provider (SSP) 50 that provides PPRC storage solutions for primary sites depicted by host servers 60a, . . . , 60n where the production applications run. The storage service provider includes primary Enterprise Storage Server (ESS) 77 that receives production data from the servers 60a, . . . , 60n, via respective Input/Output (I/O) or in-band links 65a, . . . , 65n for storage in a set of volumes 80. Particularly, host server requests for data content storage are initiated via system/server user interfaces over in-band links (e.g. ESCON, FICON, FCP).

A PPRC relationship is established with a secondary ESS or recovery site ESS 87 having volumes 85 onto which the production data is mirrored by PPRC over peer-to-peer links 90 connected by ESCON host adaptors (not shown). As shown in FIG. 1(b), a workstation 92 providing a configuration interface 95 is connected to each of the primary and secondary ESS storage systems 77, 87 via respective out-of-band links 97, 98.

A further ESS storage function is referred to as FlashCopy which provides a point-in-time (PiT) copy of a logical volume, also called T0 copy, with almost instant availability for the application of both the source and target volumes. Only a minimal interruption is required for the FlashCopy relationship to be established, so the copy operation can be initiated. The copy is then created by the ESS, with minimal impact on other ESS activities. FlashCopy may also be used in conjunction with either the local or remote copies of data created by PPRC, making it easy to create additional copies for rapid recovery following application errors or for other uses. FlashCopy is invoked at volume level taking into account the following considerations: 1). The source and target volumes must have the same track format; 2). The target volume must be at least as large as the source volume; 3). The source and target volumes must be within the same ESS logical subsystem (LSS); and 4). A source and a target volume can only be involved in one FlashCopy relationship at a time.

It is known that one use of FC is for backing data up to tape. The data on tape must be "consistent", therefore writes to the data cannot be allowed during the backup. Since many shops require 24/7 data access, FC can be used to make a copy of the data, which copy is then backed up to tape.

It is additionally understood that the FC and PPRC can be used in combinations to achieve additional functions. For example, a PPRC pair may be suspended (due to a hardware failure) and a PPRC Resync is desired. During the PPRC Resync, the secondary is not in a "consistent" state until the Resync finishes, therefore if the Resync fails, the secondary is not usable. If a FC of the PPRC secondary is made before the PPRC Resync is started, a "consistent" secondary copy is always available.

As soon as a FlashCopy establish command is issued (either invoked by a TSO (Time Sharing Operation) command, or by means of the ESS Copy Services Web user interface (WUI) (Configuration GUI) command, for example, the ESS establishes a FlashCopy relationship between the target volume and the source volume. This relationship exists from the time a FlashCopy operation is initiated, until the ESS copies all data from the source volume to the target volume. Optionally a FlashCopy may be requested not to execute the background copy, in this case the relationship must be specifically withdrawn in order to terminate it.

There are basically three stages that a FlashCopy relationship goes through: Establishing the relationship (Phase 1), then copying the data (Phase 2), and finally terminating the relationship. During the establish phase of the FlashCopy relationship, a metadata structure is created for this relationship. This metadata is used by the ESS microcode to map source and target volumes as they were at the time when the FlashCopy was requested (T0 copy), as well as to manage subsequent reads and updates to the source and target volumes. Updates to the source volume after the FlashCopy relationship is established will not be reflected on the target device. The establish process takes a minimum amount of time. As soon as the relationship is established, user programs have access to both the source and target copies of the data. With the relationship already established, and the source and target volumes already available for the applications to use them, the copy phase (Phase 2) begins. How this copy phase is conducted depends on the copy option that is selected for this FlashCopy operation. The FlashCopy relationship may be established either with or without background copy. Flash-Copy will manage the copy process differently according to a specified option.

When multiple customers share disk controllers to meet their PPRC needs, security is a primary concern for the Storage Service Providers (SSP). That is, when customers (via host servers 60a, . . . , 60n) generate in-band copy commands, they may effect integrity of an established PPRC relationship, i.e., effect the state of a remote volume and data contents written thereto.

Since existing PPRC establish commands (without the restrictions) are accepted and executed, customer data remains at risk if a PPRC establish command is issued.

It would thus be highly desirable to provide a mechanism for limiting or restricting execution of remote copy service commands in order to better preserve integrity of data copied to remote storage systems.

SUMMARY OF THE INVENTION

The present invention provides the Storage Service Provider (SSP) with the functionality to deactivate the ability to establish new PPRC (or FC) relationships, via in-band commands, after DR initialization is complete (on some or all host interfaces). If an attempt is made to establish new PPRC relationships (via in-band commands) the command is rejected.

In commonly-owned, co-pending U.S. patent application Ser. No. 10/811,573, new peer-to-peer in-band copy services commands are introduced, where restrictions are enforced on the PPRC primary, PPRC secondary (FC source) and FC target to limit command execution (for security purposes). These restrictions close a window where customer data is at risk if an arbitrary volume is used as the FC target (overlaying the original data on that volume). The present invention takes this to the next level by closing the door to certain in-band copy service commands effecting volumes when no PPRC relationships have yet been established.

Thus, according to one aspect of the invention, there is provided a system and method for controlling peer-to-peer remote copy (PPRC) operations initiated from one or more host devices that desire to store data contents written to a first storage system to a second storage system over a communications link. The system enables receipt and generation of copy services commands from host devices and the determination of whether a received command pertains to a copy service over an established PPRC relationship for that particular customer to enable that customer to perform storage operations effecting data written to a first storage server having source volumes and stored in a remote second storage system having target volumes. The copy services command effecting data contents of source volumes and/or remote target volumes will be enabled if it is determined that said PPRC relationship is already established for that customer; and, prevented if the received copy services command does effect any volume not already in a copy services relationship.

Advantageously, additional PPRC relationships can be established via the out of band (secure network) GUI commands, on unrestricted host interfaces, or by reactivating the in-band commands temporarily.

BRIEF DESCRIPTION OF THE DRAWINGS

Further features, aspects and advantages of the apparatus and methods of the present invention will become better understood with regard to the following description, appended claims, and the accompanying drawing where:

DETAILED DESCRIPTION OF THE PREFERRED EMBODIMENTS

The present invention provides the SSP with the means to deactivate the ability to establish new PPRC (or FC) relationships, via in-band commands, after DR initialization is complete (on some or all host interfaces). If an attempt is made to establish new PPRC relationships (via in-band commands) the command is rejected. Additional PPRC relationships can be established via the out of band (secure network) GUI/CLI commands, on unrestricted host interfaces, or by reactivating the in-band commands temporarily.

Figure 2:
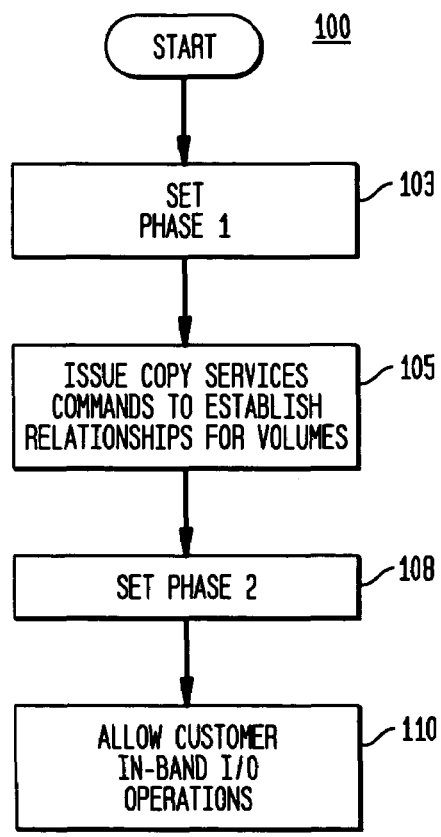
FIG. 2 is a flow chart depicting the method for tracking Phase 1 and Phase 2 relationships between source ESS and target ESS volumes in the SSP system according to the present invention; and, FIG. 3 is a flow chart depicting the method for deactivating the ability to establish new PPRC (or FC) relationships, via in band commands under certain conditions
Figure 3:
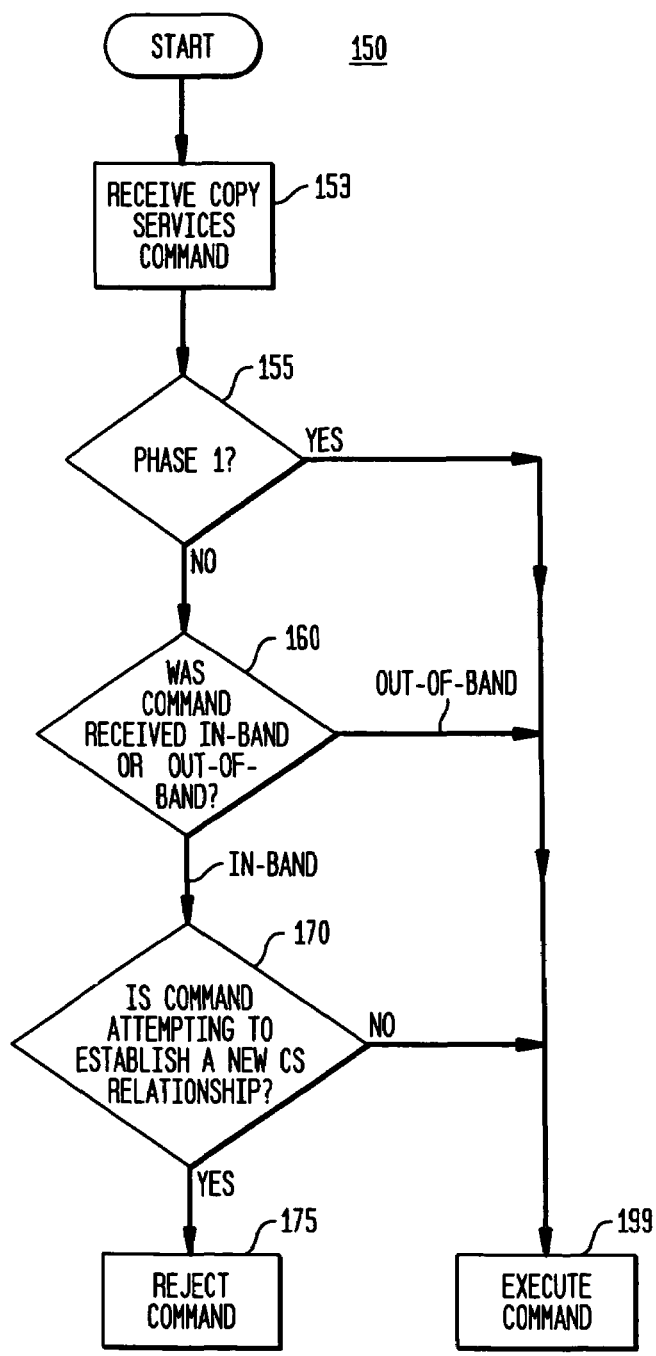

A method for deactivating the ability to establish new PPRC (or FC) relationships, via in band commands, after DR initialization is complete is now described with respect to FIGS. 2 and 3. In FIG. 2, there is illustrated the steps 100 for tracking Phase 1 and Phase 2 relationships between source ESS and target ESS volumes in the SSP system. For example, prior to issuing a copy service command for establishing PPRC relationships between a source volume and target volume as indicated at step 105, a first "phase 1" flag is set to identify the request as a command to establish the PPRC relationship for remote copying of data as indicated at step 103 for a particular host server (customer). Once source volume and target volume relationships are established at step 105, a second "phase 2" flag may be set at step 108 to indicate that a relationship has been established between the source volume and target volume, thus permitting that customer to perform in-band I/O (e.g., TSO commands, Flashcopy copy command) operations associated with that source and target volume at step 110. For example, as soon as a FlashCopy establish command is issued, the ESS establishes a Flash-Copy relationship between the target volume and the source volume, which relationship exists from the time a FlashCopy operation is initiated, until the ESS copies all data from the source volume to the target volume.

Figure 1A:
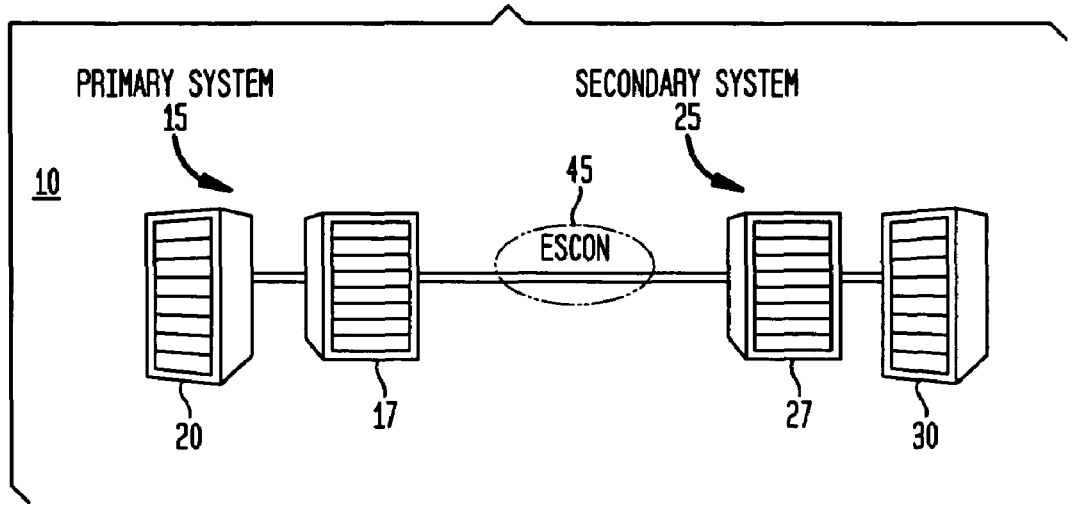
FIG. 1(a) depicts an exemplary PPRC system 10 showing a primary Enterprise Storage System 15 in communication with a secondary (remote) Enterprise Storage Systems 25.
Figure 1B:
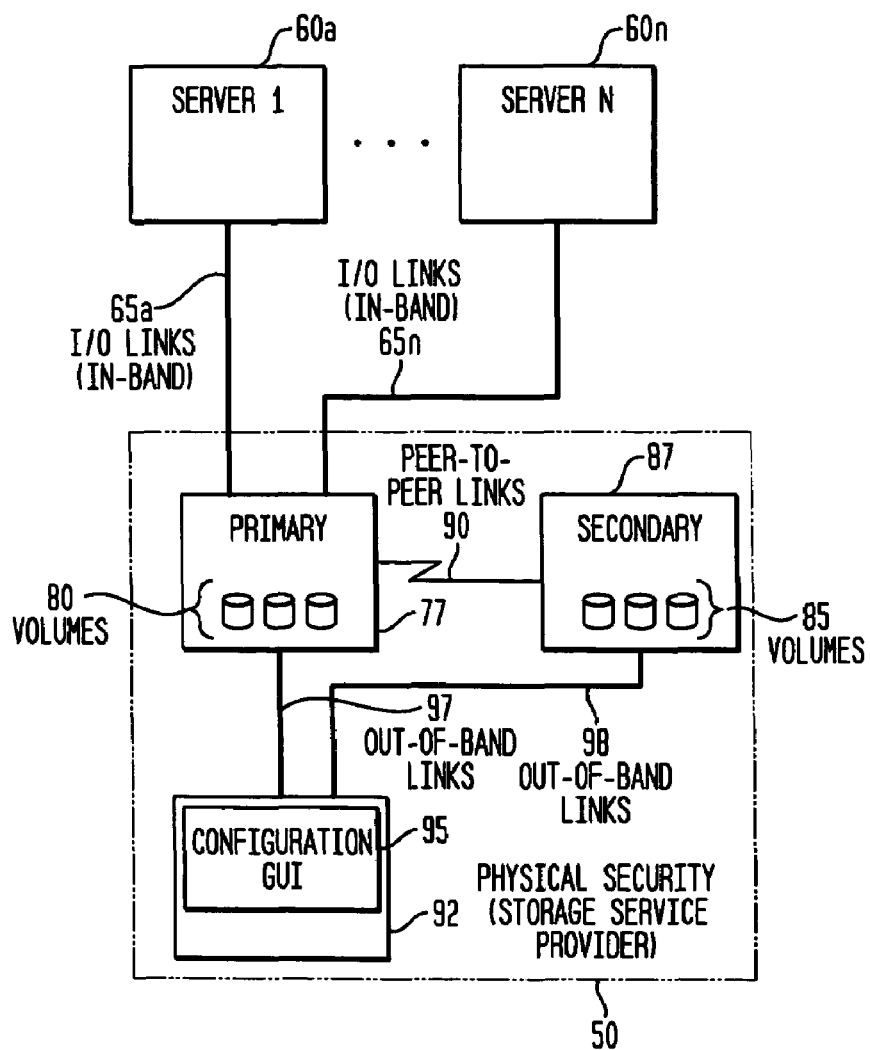
FIG. 1(b) depicts a Storage Service Provider (SSP) 50 that provides PPRC storage solutions for primary sites depicted by host servers 60a, . . . , 60n where the production applications run.

Referring now to FIG. 3, there is established the method steps 150 for deactivating the ability to establish new PPRC (or FC) relationships via in band commands under certain conditions. As shown at step 153 and depicted in FIG. 1, the primary ESS server receives both in-band copy service commands (from customer host servers) and out-of-band copy service commands (from a more secure Ethernet connection which is under control of the SSP). According to the invention, at step 155, a check is made to determine if a phase 1 flag has been set, indicating that a copy services relationship has already been established for that customer. If it is determined that the phase 1 relationship for that customer's data already exists, i.e., PPRC relationship between source and target volumes established, then the received copy services command, e.g., incremental flash copy, suspend or resynchronize, etc., may be executed at step 199. If the phase 1 relationship has not been established at step 155, then additional steps are first performed as follows: a first step 160 is performed to determine whether the current command received at step 153 is an in-band or out-of-band command. If at step 160, it is determined that the command received was an out-of-band copy services command, it is assumed generated via the GUI (or WUI) 95 of FIG. 1, and constitutes a command that is executable at step 199 as this command has been issued under SSP control. Returning to step 160, if it is determined that the command received was not an out-of-band copy services command, i.e., it is an in-band command initiated from a host server over any of the I/O in-band links, then a further determination is made at step 170 as to whether the in-band command effects any volume not already in a copy services relationship. That is, a determination is made at step 170 as to whether the in-band command is an attempt to establish a new CS relationship. If the in-band command is an attempt to establish a new CS relationship, then that command will be rejected at step 175, as a Phase 1 association indicating PPRC relationship established for that customer by the SSP has not been established. If the in-band command is not an attempt to establish a new CS relationship, i.e., does not effect any volume not already in a copy services relationship, as indicated at step 170, then the command is executable at step 199.

Preferably, a major use of the restricted commands is to initiate periodic FC copies of the data at the secondary site (for disaster recovery, DR). Typically a customer will establish the PPRC relationship (once) during initial configuration of the DR solution, and continuously initiate FC copies of the data on the secondary.

It is understood that additional PPRC relationships can be established via the out of band (secure network) GUI commands, on unrestricted host interfaces, or by reactivating the in-band commands temporarily.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for controlling peer-to-peer remote copy (PPRC) system operations initiated from one or more host devices that desire to store data contents written to a first storage system to a second storage system over a communications link, said method comprising:
    a) receiving copy services commands from said one or more host devices;
    b) determining whether a received command pertains to a copy service over a PPRC relationship established for a particular customer to perform storage operations effecting data written to a first storage server having source volumes and stored in a remote second storage system having target volumes; and,
    c) if it is determined that said PPRC relationship is already established for that customer, enabling execution of said copy services command involving data contents of source volumes and/or remote target volumes; and,
    d) if it is determined in step b) that said PPRC relationship is not already established, determining whether said received command is from a storage service provider over a web-based user interface, and enabling execution of said copy services command if it is; and, if said received command is not from a storage service provider,
    e) determining whether the copy service command effects any volume not already in a copy services relationship; and, one of
    f) enabling execution of said copy services command if it does not effect any volume not already in a copy services relationship or,
    g) preventing execution of said copy services command if it does effect any volume not already in a copy services relationship.

2. The method as claimed in claim 1, wherein a received copy services command includes: a Time Sharing Operation command, a Flashcopy copy command, a suspend or resynchronize command.

* * * * *